June 13, 1967 D. B. ARMSTRONG ET AL 3,325,651
MAGNETIC CONTROL CIRCUITS
Filed June 4, 1959 2 Sheets-Sheet 1

INVENTORS: D. B. ARMSTRONG
U. F. GIANOLA
BY
William H. Kamstra
ATTORNEY

INVENTORS: D. B. ARMSTRONG
U. F. GIANOLA
BY
William H. Kamstra
ATTORNEY

United States Patent Office 3,325,651
Patented June 13, 196[illegible]

3,325,651
MAGNETIC CONTROL CIRCUITS
Douglas B. Armstrong, Bedminster, and Umberto F. Gianola, Florham Park, N.J., assignors to Bell Telephone Laboratories, Incorporated, New York, N.Y., a corporation of New York
Filed June 4, 1959, Ser. No. 818,146
10 Claims. (Cl. 307—88)

This invention relates to electrical switching circuits and particularly to such circuits in which a predetermined combination of inputs or inputs of predetermined characteristics are a condition for the occurrence of an output or outputs. An example of the problems to which the present invention is directed is afforded by the well-known application of Boolean algebra to electrical contact networks. In this context it is necessary to provide networks in which combinations and operations of variables having only two values may be synthesized.

Electrical contact circuits capable of performing logic operations are well-known in the prior art. The basic techniques of such circuits are developed in detail, for example, by Higonnet and Grea in Logical Design of Electrical Circuits (New York: McGraw-Hill, 1958). Although electrical relay contact networks offer an excellent vehicle for the study of logic circuitry generally as evidenced in the foregoing work and other texts, in actual practice a number of problems are immediately occasioned by their use. Thus, even aside from the initial complexity of fabrication, electromagnetic relays, operating as they do through the mechanical movement of an armature, and the closure of contacts, are inherently subject to wear. The power requirements to operate a large number of relays and to maintain them in an operated condition may also prove disadvantageous. Their relative slowness of response and operation may further constitute an important drawback to the use of relays in present day high speed data processing systems. These and other problems attending the use of electrical relay circuits for logic operations have pointed up the need for a more simple, reliable logic apparatus—one in which an entire operation may advantageously be performed without the movement of mechanical parts.

The introduction of ferrite magnetic cores exhibiting substantially rectangular hysteresis characteristics has been a step forward in the attainment of a flexible, nonmechanical logic device. One recent advance in which an entire logic operation may be performed within the limits of a single magnetic structure is that described by T. H. Crowley and U. F. Gianola in the copending application Ser. No. 732,549 filed May 2, 1958, now United States Patent No. 2,963,591 which issued Dec. 6, 1960. In the magnetic structure described in the latter application a normal flux distribution present in discrete legs of the structure is shifted to new patterns under the control of holding and switching currents representing the input variables. One predetermined flux distribution pattern contained in various isolated flux path legs of the structure then fulfills the requirement for the occurrence of an output signal and indicates that the conditions of the function have been satisfied. Any desired Boolean function may be realized with the use of such a prior-art magnetic structure provided only that sufficient windings be suitably coupled to the flux paths of the structure.

In the endeavor to achieve a still more economical arrangement, and at the same time to retain all of the advantages afforded by the unitary magnetic logic structure above mentioned, attention has been directed to structural configurations by means of which the number of energized windings may be held to a minimum. The end of winding economy in magnetic structure logic elements is directly analogous to the achievement of a minimum number of contacts and springs in the performance of [illegible] logic operation in electrical contact networks. In the latte[illegible] connection, it has been found that, wherever it is possibl[illegible] to find an equivalence between a bridge configuration an[illegible] a series-parallel circuit, a bridge arrangement in almos[illegible] every case yields the greater simplification.

It is an object of this invention to provide a new an[illegible] novel unitary magnetic structure for performing logi[illegible] functions with a minimum number of energizing windings.

Another object of this invention is to achieve a magnetic analogue to relay contact logic network circuits.

Still another object of this invention is to accomplish logic operations by means of magnetic structures, the particular configurations of which are determined by the topology of analogous relay circuit networks.

A still further object of this invention is to provide a novel magnetic bridge circuit in which a precise correspondence is maintained between the control of an operating flux and the control of an operating current in analogous electrical contact bridge circuits.

Yet another object of this invention is to control the propagation of magnetic flux in a magnetic structure in either direction by means of a single set of control windings without the necessity of changing the polarity of applied control currents.

The foregoing and other objects of this invention are achieved in one illustrative embodiment thereof in which a basic magnetic control element comprises a magnetic structure exhibiting substantially rectangular hysteresis characteristics and presenting a closed primary magnetic flux circuit. A secondary flux loop is included in the primary circuit in a manner so as to present a pair of parallel branch paths to any flux appearing in the primary circuit. In order to provide positive control of flux propagation within the paths thus described, the cross-sectional areas of the various portions of the structure comprising the flux path legs are substantially equal. By applying a suitable external magnetomotive force to the primary flux circuit a flux in either direction may be induced therein. The flux so induced follows either or both of the branches in the secondary loop to achieve closure, and it is apparent that flux closure will be thus obtained without regard to the direction in which it is induced in the structure so far described. If an initial flux is induced in the secondary loop by means of windings coupled to this portion of the structure, flux in the primary loop may still be completely closed through the one of the branches in which a flux reversal can occur. The other branch would already be saturated in the direction in which the flux in the primary loop demands closure. A division of flux between the two branches would also be possible in which case the flux in the oppositely poled branch would be only partially reversed.

Flux closure in the primary loop may now be effectively prevented by providing a hold or control winding on both legs of the secondary loop and applying a hold current thereto. This effectively prevents any flux changes in either direction in the secondary loop. By means of such a hold current, the closure of flux in the primary loop in either direction is barred and the primary flux circuit is thus effectively opened. It will be appreciated that an exact analogy between the magnetic circuit thus described and an electrical circuit including therein a relay back contact exists. In the latter case, the conduction of an electrical current of either polarity may be controlled by the application of an energizing current to the relay winding to open the back contact. According to the present invention, the "conduction" of a magnetic "current" in the primary circuit is controlled depending upon whether or not an electrical control current representing an input 'ariable is applied to a control winding coupled to the econdary or control flux loop.

A reset winding coupled to the branches of the secındary or control flux loop may advantageously provide he means for restoring the magnetic circuits to their nornal condition. When a reset current is applied to the eset winding, a magnetomotive force is developed to ıgain induce the flux initially found therein which thus estores the flux loop to its flux conducting condition. [he resetting operation may thus be compared to the estoration of the back contacts upon the de-energization )f the relay in analogous relay networks. The restoration )f the flux in the control loop advantageously has the in:idental effect of clearing the primary loop of any remınent magnetization resulting from a previous switch.ng operation.

The foregoing principles of this invention are advan:ageously applied to realize direct magnetic analogues of ıny relay circuits employing back contacts. Without limiting this invention, but in order to retain simplicity in the construction of the magnetic structures to be described herein, only analogues of planar relay contact networks will be considered. When the particular topology of such a relay contact network has been established, a secondary closed flux loop path is substituted for every relay back contact and a primary flux circuit path is provided to correspond to the current conducting path which is to be controlled by the relay contacts. If current sources are available for each variable and also for its negation, an analogue of any planar relay contact circuit may be obtained. If current sources are available only for each variable or only for the negation of each variable, the analogue of the so-called "frontal" relay switching functions may be derived. In the latter case analogues of relay networks in which all the contacts are front contacts are thus advantageously possible.

In describing the principles of the present invention only its adaptation to realize analogues to relay bridge circuits will be considered. By using this generally applicable configuration, the fullest advantage in terms of winding economy is achieved. In this connection, it may be pointed out that even further savings in the number of windings required is possible. In most cases only unidirectional propagation of flux in the primary flux circuit is called for. Accordingly, in such cases a control winding need link only one of the parallel branch legs, the particular leg being determined by the direction in which the flux in the primary flux circuit is to be conducted.

It is a feature of this invention that a magnetic structure define a primary magnetic circuit which primary circuit includes a pair of parallel branches. The branches themselves are arranged to comprise legs of a secondary or control flux circuit, and it is a further feature of this invention that the control of flux in the secondary circuit may be employed to control the effectively open or closed condition of the primary magnetic circuit.

Still another feature of this invention is a magnetic structure defining a bridge circuit having a topology substantially determined by an analogous relay contact network and corresponding in structural outline thereto.

According to one aspect of this invention, it is a feature thereof that a basic magnetic control element comprise a magnetic analogue of a relay contact in constructing magnetic logic switching networks.

Another feature of this invention is a closed magnetic flux control circuit included in a primary flux circuit to present a pair of parallel branches, the branches having control windings thereon for preventing the closing of flux in the primary circuit in either direction by means of a holding current of only one polarity applied to the control windings.

The above and other objects and features of this invention may be better understood from a consideration of the detailed description of illustrative embodiments thereof which follows when taken in conjunction with the accompanying drawing in which.

Figure 3:
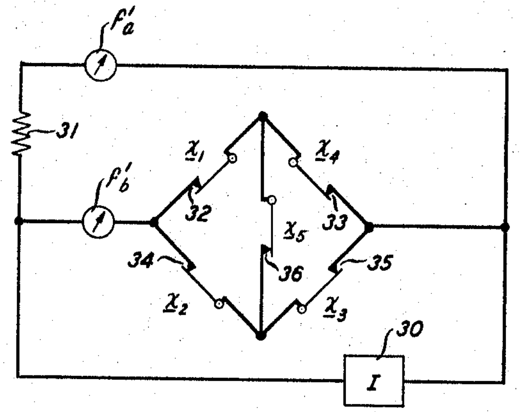
FIG. 3 is a schematic diagram of an electrical relay bridge network for performing an illustrative logic operation.
Figure 4:
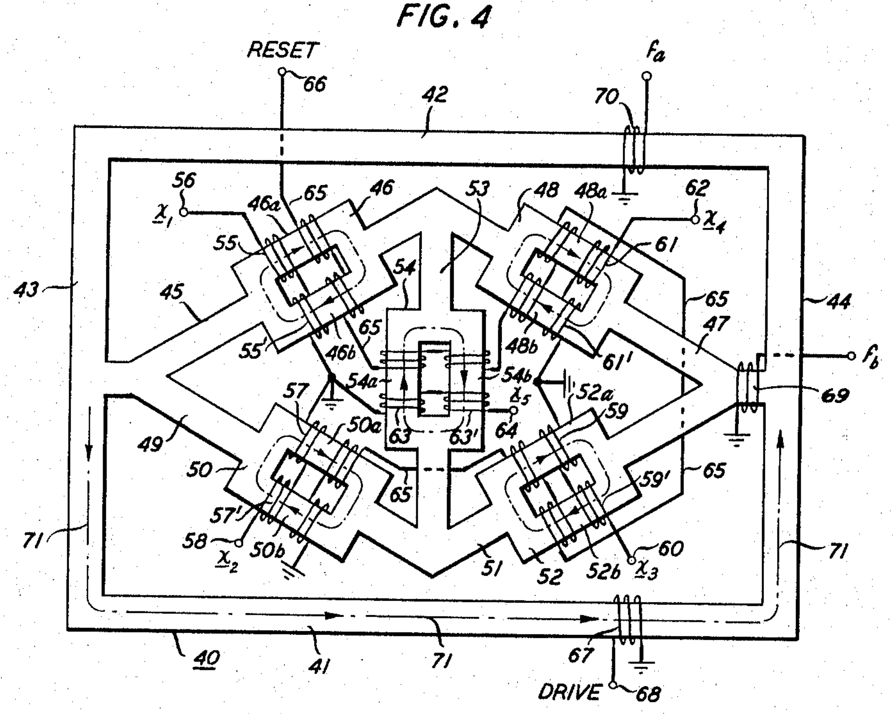
Figure 5:
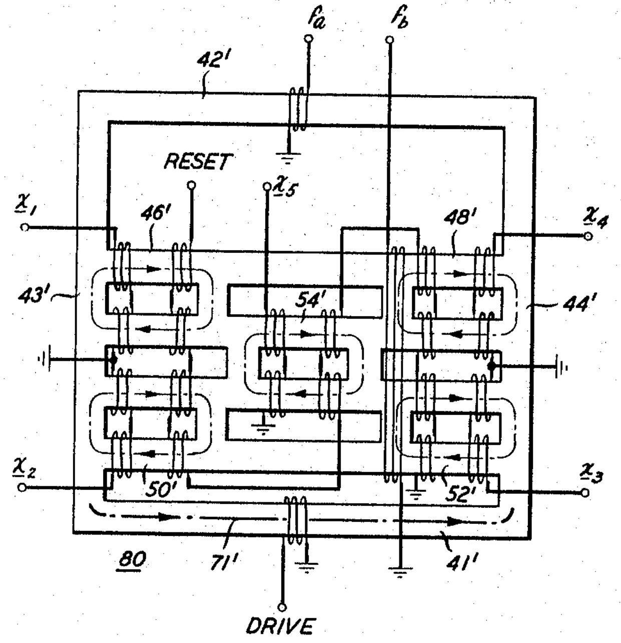

FIG. 4 shows another specific illustrative embodiment of this invention adapted for magnetically performing the illustrative logic operation also performed by the bridge circuit of FIG. 3 and which comprises the magnetic analogue of the latter circuit; and FIG. 5 shows another illustrative embodiment of this invention capable of performing the logic operation also performed by the arrangements of FIGS. 3 and 4 and utilizing a magnetic structure having a modified topology in which common flux paths are combined.

Referring now to the drawing, the illustrative embodiments there depicted may be described in detail. A structure 10 shown in FIG. 1 may be used to describe the basic aspects of this invention and is formed to define a primary or controlled flux circuit *p* indicated by a dashed line in the drawing. The flux circuit *p* follows a closed path formed by a base leg 11, a pair of return legs 12 and 13, and is completed by a pair of branching legs 14 and 15 connected via bridging legs 14' and 15' to the return legs 12 and 13 by connecting legs 16 and 17, respectively. The structure 10 is fabricated from a suitable magnetic material which, for the most advantageous operation of this invention, is of a type exhibiting substantially rectangular hysteresis characteristics. The minimum cross-sectional areas of the legs of the structure 10 so far mentioned are maintained substantially equal for reasons which will appear hereinafter. The branching legs 14 and 15 together with the bridging legs 14' and 15' define a secondary or control closed flux circuit designated by the dashed line *s*. By inspection of FIG. 1, it is evident that a saturation flux appearing in the primary circuit *p* may be closed in either direction by following either one of the branching legs 14 or 15 or such a flux may divide through the latter legs in seeking closure. Since each of the legs presents the same minimum cross-sectional area, the foregoing traced paths will constitute the only channels available to a saturation flux in the circuit *p*. The above flux closure routes assume, of course, a magnetic neutrality in the control circuit *s*.

A drive winding 18 coupled to the base leg 11 provides a means whereby a flux may be induced in the circuit *p* of the structure 10. This may be accomplished by a current pulse applied to the terminal 19 of one end of the winding 18 from any suitable source known in the art. An output winding 20 having a terminal *f* at one end is coupled to the primary flux circuit *p* at another convenient point and is shown as linking the connecting leg 17. Each of the branching legs 14 and 15 has coupled thereto a control winding and a reset winding. Thus, a control winding 21 coupled to the leg 14 is serially connected to a control winding 21' coupled to the leg 15. One end of the control winding 21 is terminated in a terminal *v*. Similarly a reset winding 22 coupled to the leg 14 is serially connected to a reset winding 22' coupled to the leg 15. One end of the reset winding 22 is terminated in a terminal *r*. The other end of each of the windings thus far described and not otherwise connected, is connected to ground.

Figure 1:
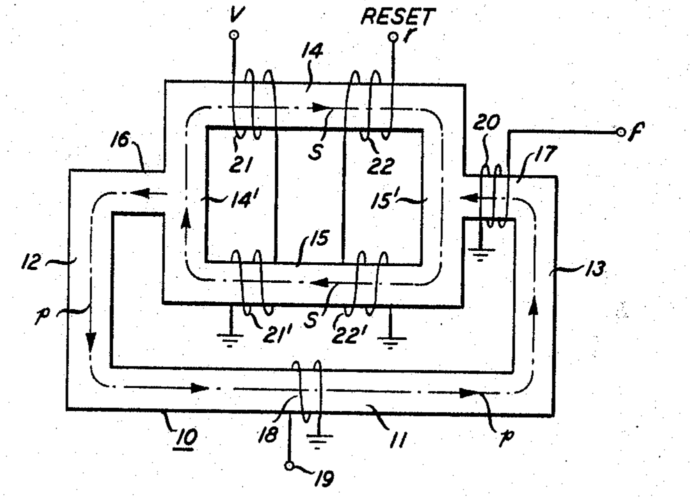
FIG. 1 shows an illustrative magnetic structure according to the principles of this invention adapted as a simple magnetic analogue of an electrical relay and its back contact together with the circuit which it controls.

Initially a reset current pulse is applied to the reset terminal *r* from a suitable pulse source known in the art. As a result of the magnetomotive forces developed by the windings 22 and 22' a saturation flux is induced in the control flux circuit *s* in a direction determined by the polarity of the reset pulse and the sense of the windings 22 and 22' and which may arbitrarily be taken as indicated by the arrows in FIG. 1. Because of the square loop characteristics of the material of the structure 10 the flux so induced remains and the structure 10 is now prepared for a switching operation. At this point, the embodiment of FIG. 1 is in a state which may be understood as analogous to the state of corresponding relay contact electrical circuit shown in FIG. 2. The latter circuit comprises a primary or controlled circuit *p'* including therein a potential source V and a resistance R. The circuit *p'* additionally includes a relay spring 23 and its contact 24 controlled by a relay 25. A secondary or control circuit *s'* controls the operation of the relay 25 and a signal may be made available by current flowing in the resistance R at a terminal *f'*.

A switching operation is initiated in the magnetic arrangement of FIG. 1 by a current pulse applied to the terminal 19 of the drive winding 18. This pulse is applied from a pulse source not shown, of a character known in the art and would be positive in view of the sense of the winding 18 indicated in FIG. 1. Such a pulse develops a magnetomotive force which induces a drive flux in the primary circuit *p* in the direction indicated by the arrows. The potential source V accomplishes an analogous operation in the electrical counterpart circuit of FIG. 2 by causing a current flow in the circuit *p'*. In each case, whether a flux is induced or current generated will depend upon the continuity of each of the circuits *p* and *p'*.

In the magnetic circuit of FIG. 1, if effective continuity for flux switching induced by the drive can be found, the resulting flux change in the leg 17 induces an output signal in the output winding 20 which signal will be available at the output terminal *f*. In the electrical circuit of FIG. 2 if the contact 24 remains closed a signal will be made available at the output terminal *f'* as a result of the current flow in the circuit *p'* and through the resistor R.

Effective continuity of the primary flux is provided in the magnetic arrangement of FIG. 1 through the reset secondary flux circuit *s*. For example, if the flux induced in primary circuit *p* by the drive current is in the direction shown in FIG. 1, then this drive flux switches through the flux limited path of leg 14. It does so by causing what may be understood as a half flux reversal to achieve a magnetic neutrality in leg 14, the flux in leg 15 remaining unchanged. Alternatively, if the flux induced in the primary circuit *p* by the drive were in the opposite sense to that shown in FIG. 1, then this drive flux would find a switching path through the flux limited path of leg 15 in the same manner.

Thus an important aspect of this invention has been demonstrated, namely, that the closure of a flux induced in the primary circuit *p* through the control circuit *s* may be achieved regardless of the polarity of the induced flux. The closure of flux through one or the other of the branches of the control circuit *s* in the manner described in the foregoing is possible in either direction since a branching leg having a reversible remanent flux therein is available in either direction. This, of course, would be a requirement of a true analogue of an electrical circuit such as the circuit *p'* of FIG. 2.

Figure 2:
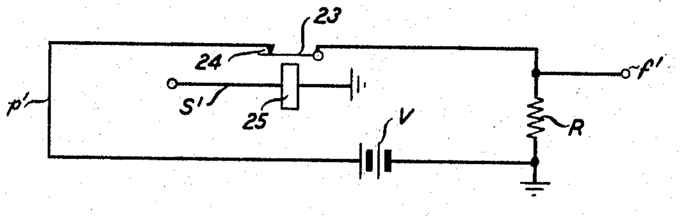
FIG. 2 is a schematic diagram of a simple relay back contact circuit of which the illustrative embodiment of FIG. 1 is the magnetic analogue.

In the foregoing, the operative states of both of the circuits of FIGS. 1 and 2 have assumed continuity, that is, states which are a condition for the presence of an output signal on the terminals *f* and *f'*. The other operative state of each circuit of FIGS. 1 and 2 is one resulting in the absence of a signal on either the terminals *f* or *f'*. In the simplified arrangements of FIGS. 1 and 2, this condition of the terminals *f* and *f'* may obviously be achieved by preventing conduction, of flux in the one and current in the other, in the primary circuits *p* and *p'*, respectively. In the case of the electrical circuit of FIG. 2, it is evident that a control input signal applied to the relay 25 control circuit *s'* will operate the relay and open the contact 24. Continuity of the primary circuit *p'* is broken as a result and a signal is thereby prevented at the output terminal *f'*. In the magnetic counterpart of FIG. 2, the functional analogy holds in the application of a holding current to the terminal *v* of the control windings 21 and 21'. Such a current may be applied from a current source, not shown, of a character well known in the art and would be positive to achieve the operation which follows. The latter current, it will be noted, is thus in a direction to drive the flux in the secondary flux loop *s* to a condition on its hysteresis loop to which the reset current has previously driven it. For purposes of describing the sequence of operations, the current being applied to the terminal *v* may be thought of as continuing and, accordingly, the flux in the secondary loop *s* is held in the saturated reset state.

As a result of the continuing hold current being applied to the control windings 21 and 21', both of the only available paths will be denied to a flux in the primary circuit *p*. For a flux induced in the latter circuit in the direction indicated in FIG. 1, the branching leg 14 will be unavailable for the reason that flux switching is prevented by applied control current. On the other hand, the leg 15 is already at or near saturation and would thus permit only a negligible additional flux, if any. As a result the flux-held state of the control circuit *s* provides an effective bar or "open" to any flux seeking closure through this path. This "open" would be equally effective for an attempted flux in the primary circuit *p* in the opposite direction. In such a case, the manner of preventing closure of flux for each of the branching legs would simply be reversed. The leg 14 would present an already saturated state and the leg 15 would be held in an unswitchable magnetic state by the current being applied to the control winding 21'. Although the latter current was thought of as being continuing in the foregoing description of a simple embodiment of this invention, obviously the only requirement is that it continue at least during the application of the drive current to the drive winding terminal 19.

It is apparent that the foregoing switching operation in which the condition was met for the absence of a signal on the terminal *f* during the application of the drive current has left the magnetic condition of the control circuit *s* undisturbed. Thus the control circuit *s* is in readiness for the next switching operation without the necessity of a reset step. However, should such a step occur in an ordered sequence of operative phases, a subsequent reset current applied to the reset windings 22 and 22' will have no essential effect on the remanent flux in the control circuit *s*. Should a switching operation have required the closure of flux through one of the branching legs 14 or 15, however, a subsequent reset operation will restore the flux in the control circuit *s* to provide for a subsequent control of flux in the primary circuit *p* in either direction. Advantageously, any remanent flux of either polarity induced in the primary circuit *p* as the result of a switching operation will also be cleared by the resetting of the control circuit *s*. The primary circuit *p* will thus be prepared for a subsequent induction of a magnetic flux of either polarity.

In describing the embodiment of this invention depicted in FIG. 1, the associated circuitry such as the current sources have been described in only general terms. The specific character of such circuits have not been considered essential to the understanding of a basic control element according to the principles of this invention. From what has been described, it is clear that a basic analogy exists between electrical relay back contact switching circuits and magnetic circuits in which flux is controlled to accomplish a switching function. This analogy is advantageously exploited according to this invention to realize other switching network configurations as exemplified by the illustrative embodiment shown in FIG. 4.

FIG. 3 shows a conventional electrical relay bridge network for performing an illustrative logic operation which is also advantageously performable by the embodiment of this invention of FIG. 4. The network of FIG. 3 comprises a circuit including a current source 30, a load resistance 31, and a current meter designated $f'_a$. The latter circuit is paralleled by a bridge circuit having included in series therewith a second current meter designated $f'_b$. The bridge circuit itself comprises a branch including back contacts 32 and 33 and a branch including back contacts 34 and 35. The branches are bridged between the contacts 32 and 33 and between the contacts 34 and 35 with a bridge including a contact 36. The relays for controlling the springs of the contacts referred to are not shown but may readily be envisioned for the purposes to be described. By inspection of FIG. 3, it is evident that any current generated by the source 30 finds a conducting path either through the branch containing the current meter $f'_b$ or the branch containing the current meter $f'_a$. In terms of the logic operations possible with the network of FIG. 3, the current meter $f'_a$ accordingly provides the "hindrance" function of the bridge network while the current meter $f'_b$ yields its complement, the "transmission" function. Specifically, the former function may be stated by the expression $$f_a=x_1x_2+x_3x_4+x_1x_5x_3+x_2x_5x_4 \qquad (1)$$

The variables controlling the foregoing expression have been indicated in FIG. 3 adjacent the representative back contacts.

In accordance with the principles of this invention a magnetic structure analogous to the circuit of FIG. 3 and which is capable of performing the foregoing logic operation is readily derived as shown in FIG. 4. A magnetic structure 40 is fabricated to present a drive leg 41 and an output leg 42 connected to define a closed magnetic flux circuit by a pair of side legs 43 and 44. A shunting bridge network of magnetic flux paths is connected between the side legs 43 and 44 and comprises a branch 45 including a control flux circuit 46 and a branch 47 including a control flux circuit 48. The bridge network further comprises a branch 49 including a control flux circuit 50 and a branch 51 including a control flux circuit 52. A bridging branch 53 including a control flux circuit 54 is connected between the branches 45 and 47 and between the branches 49 and 51. The magnetic material of which the structure 40 is formed is advantageously also of a type exhibiting substantially rectangular hysteresis characteristics. Each of the structural portions defining the various flux circuit legs and branches has substantially the same minimum cross-sectional area so that no one path will permit a greater flux density than any other available path.

Input variables are introduced into the network of FIG. 4 in the form of control currents applied to control windings coupled to the respective control flux circuits 46, 48, 50, 52, and 54. Thus control windings 55 and 55' are serially connected between a terminal 56 and ground and are coupled respectively to the legs **46*a* and 46*b* of the control circuit 46. Control windings 57 and 57' are serially connected between a terminal 58 and ground and are coupled respectively to the legs 50*a* and 50*b* of the control circuit 50. The legs 52*a* and 52*b* of the control circuit 52 have coupled thereto the control windings 59 and 59' which are serially connected between a terminal 60 and ground. The control circuit 48 has coupled to its legs 48*a* and 48*b* the control windings 61 and 61', respectively, which windings are serially connected between a terminal 62 and ground. Finally, the legs 54*a* and 54*b* of the control circuit 54 have coupled thereto control windings 63 and 63', respectively, which windings are serially connected between a terminal 64 and ground. The terminals 56, 58, 60, 62, and 64** are also designated respectively by the input variables introduced thereon, $x_1$, $x_2$, $x_3$, $x_4$, and $x_5$.

A reset winding is also coupled to each of the legs of the control circuits 46, 48, 50, 52 and 54, the reset windings not being specifically designated herein. The latter windings are serially connected in a reset circuit 65 between a reset terminal 66 and ground. The drive leg 41 of the structure 40 has coupled thereto a drive winding 67 connected between a driven input terminal 68 and ground. An output winding 69 is provided at one of the convergences of the bridge, in this case the convergence at the side leg 44 is arbitrarily selected. The winding 69 is connected between an output terminal $f_b$ and ground. A second output winding 70 is coupled to the output leg 42 and is connected between a second output terminal $f_a$ and ground.

Assuming a reset flux pattern in each of the control flux circuits 46, 48, 50, 52, and 54 in the directions indicated therein by the arrows and dashed lines in FIG. 4, an illustrative operation may be described. In the input phase of operation, a drive current pulse is applied from a pulse source, not shown, to the drive input terminal 68. The pulse source may comprise any suitable source known in the art capable of providing a constant current of sufficient magnitude to induce a saturation flux in the drive leg 41. The polarity of the drive current pulse will be determined by the sense of the drive winding 67 and the direction of the drive flux to be induced. In the illustrative operation being described a flux in the direction indicated by the arrows and dashed line 71 in FIG. 4 is assumed and accordingly a positive current is applied to the terminal 68. The flux so induced will close through the shortest available path in accordance with known principles of flux propagation. Accordingly, the flux induced in the drive leg 41 will close through the bridge network if an available path can be found. However, if the proper combination of "open" control flux circuits are presented, the induced drive flux will of necessity be steered around the longer path presented by the output leg 42. Accordingly, if any of the conditions set by the illustrative expression (1) given hereinbefore are met, all of the available flux paths through the bridge network will be "open" to an induced flux at some point. This may be demonstrated by taking from the expression (2) one of the conditions, $$x_1x_2 \qquad (2)$$

In this condition a control current pulse is applied to each of the terminals 56 and 58 during the time that the drive current pulse is being applied to the drive input terminal 68. As a result, the control currents, operating through the control windings 55 and 55' and 57 and 57' of the control flux circuits 46 and 50, respectively, will maintain the reset flux in each of the legs **46*a*, 46*b*, 50*a*, and 50*b* against the switching magnetomotive force of the induced drive flux attempting closure through the bridge network. Both of the two paths thus blocked prevent closure through the shortest route and as a result the drive flux is steered through the output leg 42. The resulting flux change in the latter leg induces a voltage signal in the output winding 70** which signal appears on the output terminal $f_a$ indicating that the function $f_a$ has been realized in accordance with one of the terms (2) of the illustrative expression (1) given hereinbefore.

Should any path through the network be available to the induced flux a "transmission" function $f_b$ may be realized. In the illustrative arrangement of FIG. 4, this function may be given by the expression:

$$f_b=x'_1x'_4+x'_2x'_3+x'_1x'_5x'_3+x'_2x'_5x'_4 \qquad (3)$$

Taking one of the conditions of the foregoing expression $$x'_1x'_5x'_3 \qquad (4)$$

the closure of flux through the bridge network whereby the output leg 42 is shunted may be demonstrated. In accordance with the back contact analog to relay contact circuits, the negation variables of the term (4) are represented by an absence of a control current on each of the terminals 56, 64, and 60 corresponding to the variables $x_1$, $x_5$, and $x_3$, respectively. Whatever may be the conductive condition of other possible flux paths through the bridge network, a flux path will now be available to an induced flux of a polarity indicated by the arrows and dashed line 71 which may be traced as follows: the branch 51 including the leg 52*a*, bridging branch 53 including the leg 54*b*, and branch 45 including the leg 46*a*. As a result of the flux change in the bridge network an output voltage will be induced in the output winding 69 which voltage will appear on the output terminal $f_b$ as a signal representing the fact that the function $f_b$ has been realized. Since all of the induced flux has traversed the bridge network, no appreciable flux change occurs in the output leg 42 and no signal appears on the output terminal $f_a$ in this case.

According to one feature of this invention, the immediately foregoing function, $f_b$, may be generated whatever the direction of the flux induced in the drive leg 41. Thus, had the flux been induced in the drive leg 41 in the direction opposite to that indicated by the arrows and dashed line 71, the path traced through the bridge network would have included the legs 46*b*, 54*a*, and 52*b* of the respective control flux circuits 46, 54, and 52. The flexibility thus available assumes, of course, a readily accomplished adjustment in the sense of the output or drive windings in accordance with the available drive currents and desired polarity of the $f_a$ and $f_b$ output signals.

Once the structure 40 of the embodiment of FIG. 4 has been determined by applying the novel concepts of this invention, inspection of its topology suggests a manner in which it and other structures so derived may be further simplified and fabrication facilitated. The structure 80 of the FIG. 5 is the functional equivalent of the structure 40 of FIG. 4. By combining common flux paths wherever possible to reduce the overall size of the structure, the length of the connecting members between the control flux circuits is also advantageously minimized. Primed reference characters designating identical parts of the structures 40 and 80 have been employed to demonstrate the correspondence between the two structures. Thus, the drive leg 41′, side legs 43′, and 44′, and output leg 42′ remain unchanged. Each of the closed control flux circuits 46′, 48′, 50′, 52′, and 54′, comprising the bridge network connected between the side rails 43′ and 44′ are also readily identifiable in the structure 80 of FIG. 5. Each of the control flux circuits 46′, 48′, 50′, 52′, and 54′ also have inductively coupled to the branching legs thereof, control and reset windings which are identical to the corresponding windings of the structure 40 of FIG. 4. These windings have been designated simply by particular variable and operation performed. An output winding to realize the $f_a$ function is coupled to the output leg 42′ of the structure 80 and a drive winding is coupled to the drive leg 41′. An output winding for realizing the function $f_b$ is coupled in this case to each possible path through the bridge network by means of a single winding enclosing the bridge structure.

Assuming a flux distribution in each of the flux control flux circuits 46′, 48′, 50′, 52′, and 54′ indicated in FIG. 5 as being the same as that of the corresponding circuits of the structure 40 of FIG. 4 and assuming further that any one of the conditions of the illustrative expression (3) given above is met, an $f_b$ output will be generated because at least one possible flux path through the bridge network is available. For example, taking the condition $x'_1\ x'_5\ x'_3$ which was used for demonstration purposes previously, the closure of flux through the bridge network whereby the output leg 42′ is shunted may be demonstrated. In this case, a flux path will be available to an induced flux of the polarity indicated in FIG. 5, along leg 44′, to the left as viewed in FIG. 5 in the upper branches of control circuits 52′, 54′, and 46′, respectively and returned along the leg 43′. For realizing the $f_a$ function, by inspection, a flux path is seen to be available around the peripheral legs 44′, 42′, and 43′.

What have been described are considered to be only illustrative embodiments of the present invention. It is to be understood that various and numerous other arrangements may be devised by one skilled in the art without departing from the spirit and scope of this invention.

What is claimed is:

1. A magnetic control circuit comprising a magnetic structure of a material capable of assuming a plurality of stable flux states, said structure being apertured to present a plurality of flux legs of equal minimum cross-sectional areas therein, said flux legs being arranged such that a first and a second of said legs alone are connected together at each end to opposite ends of a third flux leg to form a first and a second juncture each having only the respective ends of said first, second, and third flux legs terminating thereat, said third leg defining a primary flux circuit having a pair of parallel branch flux circuits therein defined by said first and second legs, means for applying a magnetomotive force to said third flux leg, and means for preventing flux closure in either direction through either of said pair of branch flux circuits comprising a pair of serially connected control windings coupled respectively to said first and second legs and means for applying a control current of a single polarity to said control windings.

2. A magnetic control circuit comprising a magnetic structure of a material capable of assuming a plurality of stable flux states, said structure being apertured to present a plurality of flux legs of equal minimum cross-sectional areas therein, said flux legs being arranged such that a first and a second of said legs alone are connected together at each end to opposite ends of a third flux leg to form a first and a second juncture each having only the respective ends of said first, second, and third flux legs terminating thereat, said third leg defining a portion of a first magnetic circuit, said first and second legs defining alternate remaining portions of said first magnetic circuit, said last-mentioned legs defining a second flux circuit, means for inducing a reset stable flux state in said first and second legs and said second flux circuit, means for inducing a drive flux in said third flux leg, and means for preventing closure of a drive flux in either direction through said first and second legs comprising a first control winding coupled to said first leg in one sense, a second control winding serially connected to said first control winding and coupled to said second leg in the opposite sense, and means for applying a control current of a single polarity to said first and second control windings to prevent flux reversals in said first and second flux legs; and an output winding linking said first magnetic flux circuit energized responsive to a flux change in said last-mentioned flux circuit for generating an output signal.

3. A magnetic control circuit comprising a magnetic structure having substantially rectangular hysteresis characteristics, said structure being apertured to present a plurality of flux legs therein, said legs defining a single closed magnetic flux loop and further defining a first and a second flux access path on opposite sides of said loop to divide said loop into only a pair of parallel branch paths, such that flux access is possible at said opposite sides of said single loop only at said first and second flux access paths, each of said legs of said structure and said access paths being so dimensioned in minimum cross-sectional areas as to be limited in flux capacity to substantially the same magnitude of flux, means for inducing a reset remanent flux in said loop, and means for preventing access to said flux loop of external flux at either of said access paths comprising a first control winding coupled to one of said parallel branch paths in one sense, a second control winding serially connected to said first control winding and coupled to the other of said parallel branch paths in the opposite sense, and a current source for applying a control current of only a single polarity to said first and second control windings to prevent the switching of flux in either or said parallel branch paths.

4. A magnetic control circuit according to claim 3 also comprising an output winding coupled to said structure for detecting flux changes in said flux loop.

5. A magnetic control circuit comprising a magnetic core construction of a material having substantially rectangular hysteresis characteristics comprising first and second flux legs of equal cross-sectional area having one end coupled together at a juncture, the other ends of said first and second flux legs being coupled to said juncture by a return flux path, means for inducing a reset flux in one direction in said first flux leg and in the opposite direction in said second flux leg in accordance with a first input signal, means for causing a flux change in only one of said first or second flux legs in accordance with the reset flux orientation comprising means for inducing a drive flux in a particular direction in said return flux path; and means for detecting flux changes in either of said first or second flux legs for obtaining an output signal comprising an output winding coupled to said return flux path.

6. A signal translating device of a magnetic core construction wherein said core exhibits remanence plus low permeability at saturation comprising first and second flux legs of equal cross-sectional area having one end coupled together at a juncture, the other ends of said first and second flux legs being coupled to said juncture by a return flux path, means for selectively orienting the flux in said first and second legs in accordance with an input signal, means for causing a flux change in only one of said first or second flux legs in accordance with the preset flux orientation, and means associated with each of said first and second legs for obtaining an output in response to said flux change.

7. A magnetic logic circuit comprising a magnetic structure having substantially rectangular hysteresis characteristics, said structure defining a plurality of substantially equally flux-limited connected legs, said plurality of legs including a drive leg, an output leg, and a network of legs presenting a plurality of flux paths shunting said output leg, each of said plurality of flux paths comprising only a pair of branch paths defining a single closed control flux circuit, a reset winding on each branch of said pair of branch paths, and a control winding pair coupled to one branch in one sense and coupled to the other branch in the opposite sense; circuit means for serially applying a reset current to each of said reset windings to induce a closed reset flux in each of said control flux circuits, means including a drive winding coupled to said drive leg for inducing a drive flux in said drive leg, and means for selectively controlling the continuity of the plurality of flux paths through said network to said drive flux in either direction comprising means for selectively applying holding currents representative of input variables to said control winding pairs for preventing flux reversals in the coupled pairs of branch paths.

8. A magnetic logic circuit according to claim 7 also comprising an output winding coupled to a shunting flux path in said network available to said drive flux and energized responsive to the closure of sai drive flux through said available flux path for generating an output signal representative of a first function of said variables.

9. A magnetic logic circuit according to claim 7 also comprising an output winding coupled to said output leg and energized responsive to the closure of said drive flux through said output leg for generating an output signal representative of a second function of said variables.

10. A magnetic logic circuit according to claim 7 in which said network of legs comprises a magnetic bridge circuit.

References Cited

UNITED STATES PATENTS

| | | | |
|---|---|---|---|
| 2,689,328 | 9/1954 | Logan | 307—88 |
| 2,745,908 | 5/1956 | Cohen | 307—88 |
| 2,868,451 | 1/1959 | Bauer | 307—88 |
| 2,869,112 | 1/1959 | Hunter | 307—88 |
| 2,917,238 | 12/1959 | Blizard | 340—174 |
| 2,951,245 | 8/1960 | Kihn | 340—174 |
| 2,955,212 | 10/1960 | Mallery | 340—174 |
| 2,988,649 | 6/1961 | Stabler | 340—174 |

BERNARD KONICK, *Primary Examiner.*

EVERETT R. REYNOLDS, JOHN F. BURNS, JAMES W. MOFFITT, J. J. POSTA, *Assistant Examiners.*